US008812698B2

(12) United States Patent
Blum et al.

(10) Patent No.: US 8,812,698 B2
(45) Date of Patent: Aug. 19, 2014

(54) METHOD OF AND SYSTEM FOR ENFORCING AUTHENTICATION STRENGTH FOR REMOTE PORTLETS

(75) Inventors: Daniel Blum, Stuttgart (DE); Jan Paul Buchwald, Boeblingen (DE); Richard Jacob, Ostfildern (DE); Timo Kussmaul, Boeblingen (DE); Oliver Then, Aidlingen (DE)

(73) Assignee: International Business Machines Corporation, Armonk, NY (US)

( * ) Notice: Subject to any disclaimer, the term of this patent is extended or adjusted under 35 U.S.C. 154(b) by 1394 days.

(21) Appl. No.: 12/099,188

(22) Filed: Apr. 8, 2008

(65) Prior Publication Data

US 2009/0254979 A1  Oct. 8, 2009

(51) Int. Cl.
G06F 15/16 (2006.01)
G06F 15/173 (2006.01)
G06F 3/00 (2006.01)
G06F 7/04 (2006.01)

(52) U.S. Cl.
USPC ........... 709/229; 709/203; 709/217; 709/225; 715/741; 726/2

(58) Field of Classification Search
USPC ........ 709/203, 217, 225, 229; 726/2; 715/471
See application file for complete search history.

(56) References Cited

U.S. PATENT DOCUMENTS

| | | | |
|---|---|---|---|
| 7,548,957 B1 * | 6/2009 | Wichmann et al. | 709/217 |
| 2003/0163513 A1 * | 8/2003 | Schaeck et al. | 709/201 |
| 2005/0223412 A1 | 10/2005 | Nadalin et al. | |
| 2005/0262219 A1 | 11/2005 | Allamaraju et al. | |
| 2007/0110233 A1 * | 5/2007 | Polk et al. | 380/30 |
| 2007/0112798 A1 * | 5/2007 | Polk et al. | 707/100 |
| 2007/0112913 A1 * | 5/2007 | Bales | 709/204 |

(Continued)

OTHER PUBLICATIONS

"Web Services for Remote Portlets Specification", published Sep. 3, 2003.*

Primary Examiner — Emmanuel L Moise
Assistant Examiner — Vitali Korobov
(74) Attorney, Agent, or Firm — Yudell Isidore Ng Russell PLLC

(57) ABSTRACT

In a method of and system for enforcing authentication strength for remote portlets, a portlet is provided by a producer portal and consumed as remote portlet by a consumer portal. The producer portal defines an authentication strength level requirement for the portlet. A user requests the remote portlet from the consumer portal. The consumer portal authenticates the user with a particular authentication method that implies a particular authentication strength level. The producer portal authenticates the consumer portal with a particular authentication method that implies a particular authentication strength assertion level. The consumer portal requests the portlet from the producer portal with an assertion of the authentication strength level of the user. The producer portal rejects the request from the consumer portal if the authentication strength level of the user is less than the authentication strength level requirement for the portlet. The producer portal also rejects the request from the consumer portal if the authentication strength assertion level of the consumer portal is not high enough to assert the authentication strength level of the user. The producer portal accepts the request from the consumer portal only if the authentication strength level of the user is not less than the authentication strength level requirement for the portlet and the authentication strength assertion level of the consumer portal is high enough to assert the authentication strength level of the user.

1 Claim, 2 Drawing Sheets

(56) References Cited

U.S. PATENT DOCUMENTS

| | | | |
|---|---|---|---|
| 2007/0113187 A1* | 5/2007 | McMullen et al. | 715/742 |
| 2007/0113188 A1* | 5/2007 | Bales et al. | 715/742 |
| 2007/0113201 A1* | 5/2007 | Bales et al. | 715/810 |
| 2007/0124460 A1* | 5/2007 | McMullen et al. | 709/224 |
| 2007/0209011 A1* | 9/2007 | Padmanabhuni et al. | 715/762 |
| 2007/0240063 A1 | 10/2007 | Cheng et al. | |
| 2008/0295164 A1* | 11/2008 | Steiner et al. | 726/14 |
| 2009/0031004 A1* | 1/2009 | Yagoda et al. | 709/218 |

\* cited by examiner

METHOD OF AND SYSTEM FOR ENFORCING AUTHENTICATION STRENGTH FOR REMOTE PORTLETS

BACKGROUND OF THE INVENTION

1. Technical Field

The present invention relates in general to the field of Web-based applications that include remote portlets, and more particularly to a method of and system for enforcing authentication strength for accessing remote portlets.

2. Description of the Related Art

Web-based applications have become very popular. One type of Web-based application may be created using the Web Services for Remote Portlets (WSRP) standard. According to the WSRP standard, producers host portlets that perform various functions, and provide those portlets to consumers using a web service interface. Consumers integrate portlets provided by a producer as remote portlets, such that they can be used as if deployed locally. Users access the remote portlets in the context of portal pages or applications from the consumers. The WSRP standard basically defines the web service interface for the communication of consumers and producers to allow interoperability between different suppliers.

A problem with current Web-based applications using remote portlets is security. Remote portlets are assets that may contain or provide access to valuable, proprietary or otherwise sensitive information. Access to secure information or sites is typically controlled through a process of authentication. Various levels of authentication associated to different authentication methods (e.g. user name/password, one time token, certificate) may be required for access depending on the level of protection required for the information. Since the producer provides a portlet to the consumer which in turn provides the portlet to the user, both the consumer and the user need to be authenticated to the producer. However, currently neither authentication strength enforcement nor authentication of both the consumer and the user to the producer are supported in a generic way by the WSRP standard or implementer specific enhancements.

SUMMARY OF THE INVENTION

The present invention provides a method of and system for enforcing authentication strength for remote portlets. A portlet is provided by a producer portal and consumed as remote portlet by a consumer portal. The producer portal defines an authentication strength level requirement for the portlet. A user requests the remote portlet from the consumer portal. The consumer portal authenticates the user with a particular authentication method that implies a particular authentication strength level. The producer portal authenticates the consumer portal with a particular authentication method that implies a particular authentication strength assertion level. The consumer portal requests the portlet from the producer portal with an assertion of the authentication strength level of the user. The producer portal rejects the request from the consumer portal if the authentication strength level of the user is less than the authentication strength level requirement for the portlet. The producer portal also rejects the request from the consumer portal if the authentication strength assertion level of the consumer portal is not high enough to assert the authentication strength level of the user. The producer portal accepts the request from the consumer portal only if the authentication strength level of the user is not less than the authentication strength level requirement for the portlet and the authentication strength assertion level of the consumer portal is high enough to assert the authentication strength level of the user.

BRIEF DESCRIPTION OF THE DRAWINGS

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying drawings, where:

DETAILED DESCRIPTION OF THE PREFERRED EMBODIMENT

Figure 1:
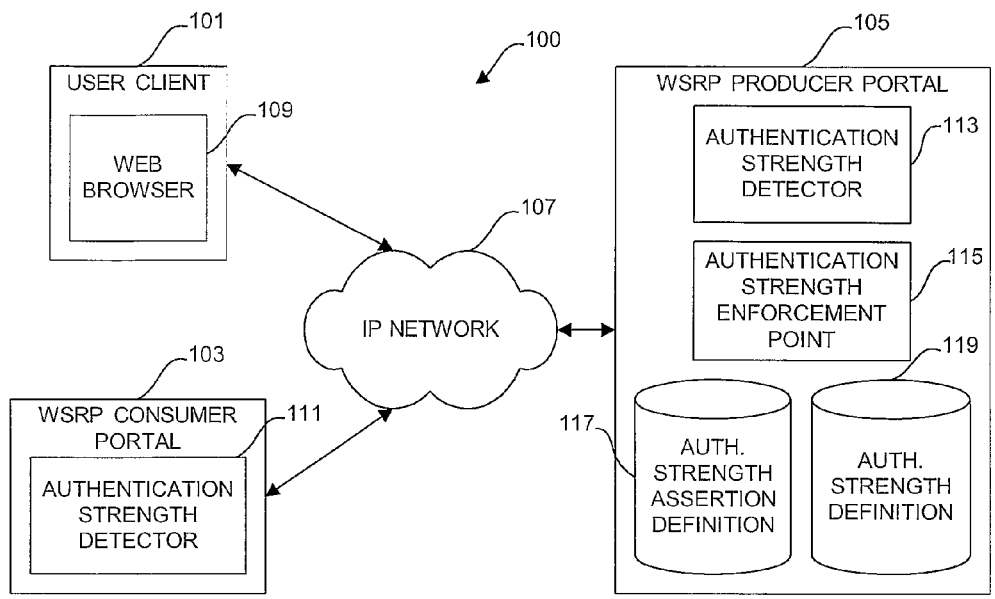
FIG. 1 is a block diagram of an embodiment of a system according to the present invention.

Referring flow to drawings, and first to FIG. 1, an embodiment of a system according to the present invention is designated generally by the numeral 100. System 100 includes a user client 101, a consumer portal 103, and a producer portal 105. User client 101, consumer portal 103, and producer portal 105 may communicate with each other through an Internet Protocol (IP) network indicated generally at 107. User client 101, consumer portal 103, and producer portal 105 comprise suitably programmed computers. In the illustrated embodiment, consumer portal 103 and producer portal 105 are configured according to the Web Services for Remote Portlets (WSRP) standard. Network 107 may comprise any IP network, such as the Internet.

User client 101 includes a web browser 109, which may be any web browser such as Microsoft Internet Explorer, Mozilla Foxfire, or the like. As is known to those skilled in the art, producer portal 105 hosts portlets and provides such services as self-description, markup, registration, and portlet management. Consumer portal 103 hosts web based applications that aggregate information in the form of portlets from producers. Generally, consumers route requests from users to appropriate producers, which, in turn, process the requests and send the results back to the consumer. The consumer aggregates the results coming from various producers and sends the final result back to the user.

According to the present invention, portlets produced by producer portal 105 each have an authentication strength level requirement. In order to provide a portlet to consumer portal 103 for use by user client 101, both consumer portal 103 and user client 101 must have authentication strength equal to or greater than the authentication strength level requirement for the portlet. Consumer portal 103 includes an authentication strength detector component 111. Authentication strength detector component 111 is adapted to retrieve the current authentication strength of a user client and propagate that authentication strength to producer portal 105. Producer portal includes an authentication strength detector component 113, which is adapted to detect the authentication strength of consumer portal 103. Additionally, according to the present invention, consumer portal 103 must have an authentication strength level that enables it to assert the authentication strength level of user client 101. Producer portal 105 includes an authentication strength enforcement point 115 that includes logic, which will be explained in detail hereinafter, that evaluates authentication strength information against resource requirements. Producer portal 105 includes an authentication strength assertion definition database 117 and an authentication strength definition database 119. Authentication strength enforcement point 115 uses information from databases 117 and 119 to determine whether to grant a particular consumer and a particular user access to a particular portlet.

Figure 2:
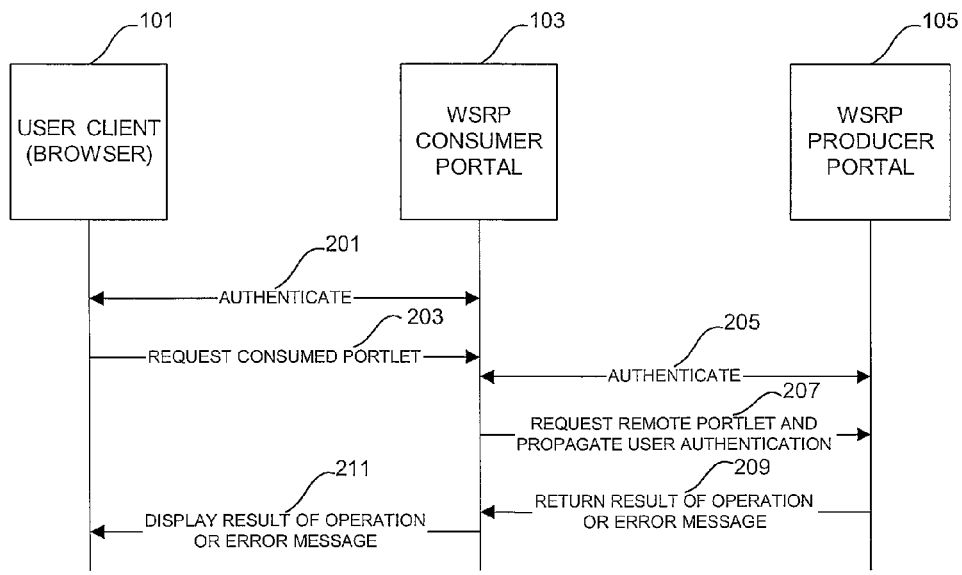
FIG. 2 is a message flow diagram of an embodiment of the present invention; and, FIG. 3 is a flow chart of an embodiment of producer portal authentication strength enforcement processing according to the present invention.

FIG. 2 is a message flow diagram of an embodiment of the present invention. User client 101 authenticates itself to consumer portal 103, as indicated at 201. After authentication, user client 101 requests a portlet from consumer portal 103, as indicated at 203. Consumer portal 103 determines that the producer of the requested portlet is producer portal 105. Consumer portal 103 authenticates itself to producer portal 105, as indicated at 205. After authentication, consumer portal 103 requests the remote portlet from and propagates user client authentication information to producer portal 105, as indicated at 207. Producer portal 105 performs authentication strength enforcement processing, as will be described in detail hereinafter. As a result of authentication strength enforcement processing, producer portal 105 returns either the requested portlet or an error message to consumer portal 103, as indicated at 209. Consumer portal 103 displays either the requested portlet or an error message, as indicated at 211.

Figure 3:
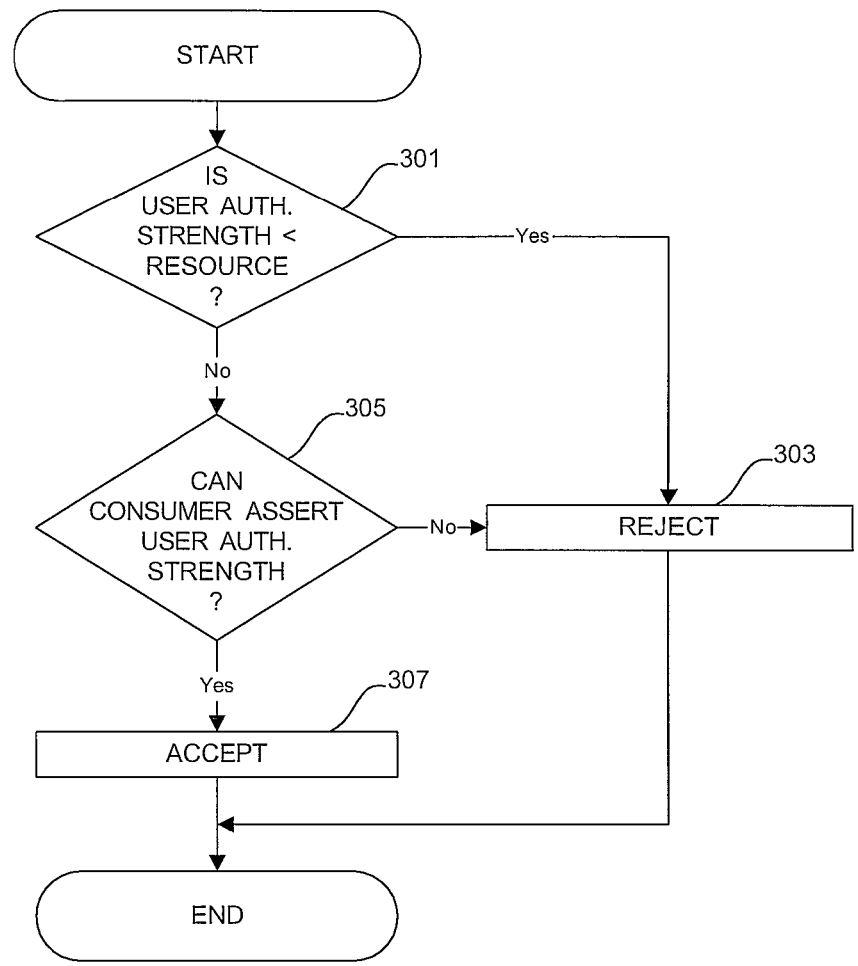

FIG. 3 is a flow chart of an embodiment of authentication strength enforcement processing according to the present invention. The authentication strength enforcement point of the producer portal determines, at decision block 301, if the user client authentication strength is less than the authentication strength level requirement for the requested resource. If so, the authentication strength enforcement point rejects the request, at block 303. If, as determined at decision block 301, the user client authorization strength is not less than the authorization strength level requirement for the requested resource, the authentication strength enforcement point determines, at decision block 305, if the requesting consumer portal is authorized to assert the user client's authorization strength. If not, the authentication strength enforcement point rejects the request, at block 303. Thus, the authentication strength enforcement point will accept the request, at block 307, only if the user client authentication strength level is not less than the authentication strength level requirement for the requested resource and the requesting consumer portal has sufficient authority to assert the user client's authentication strength level.

As an example of authentication strength level enforcement according to embodiments of the present invention, consider that on the consumer side there are four possible values for the user client authentication. For example, level 0 is unauthenticated, level 1 is authenticated by a cookie, level 2 is authenticated by a user ID and password, and level 3 is authenticated by an SSL client certificate. On the producer side, consider three possible values for the consumer authentication. For example, level 0 is unauthenticated, level 1 is authenticated by a signed user name token, and level 2 is authenticated by an SSL client certificate. According to an example of one authentication strength assertion definition, consumer authentication level 0 can assert user client authentication level 0, consumer authentication level 1 can assert user client authentication level 2 and below, and consumer authentication level 2 can assert user client authentication level 3 and below. Remote portlet A requires user client authentication level 2, and remote portlet B requires user client authentication level 3:

Case 1: If the user client's authentication is level 2 and the consumer portal's authentication is level 0, requests for A or B will be rejected.

Case 2: If the user client's authentication is level 2 and the consumer portal's authentication is level 1, requests for A will be accepted but requests for B will be rejected.

Case 3: If the user client's authentication is level 3 and the consumer portal's authentication is level 1, requests for A will be accepted but requests for B will be rejected.

Case 4: If the user client's authentication is level 3 and the consumer portal's authentication is level 2, requests for A or B will be accepted.

As an extension to the preferred embodiment, in case of rejected requests the producer can transport the required authentication level back to the consumer. This enables the consumer to either execute actions to meet the required authentication or expose details for problem analysis. Alternatively, the configuration of authentication strengths can be shared between consumer and producer. This enables the consumer to make sure the user client authentication and consumer authentication are sufficient before performing the WSRP request for a particular portlet to the consumer.

From the foregoing, it will be apparent to those skilled in the art that systems and methods according to the present invention are well adapted to overcome the shortcomings of the prior art. While the present invention has been described with reference to presently preferred embodiments, those skilled in the art, given the benefit of the foregoing description, will recognize alternative embodiments. Accordingly, the foregoing description is intended for purposes of illustration and not of limitation.

What is claimed is:

1. A system for enforcing authentication strength for remote portlets, the system comprising:
   a consumer portal;
   a producer portal in communication with said consumer portal;
   logic executing on the producer portal that performs the functions of:
      authenticating a user to said consumer portal, said user having an authentication strength level;
      receiving a request from said user at said consumer portal for a portlet, said portlet being produced by said producer portal and said portlet having an authentication strength level requirement;
      authenticating said consumer portal to said producer portal, said consumer portal having an authentication strength assertion level;
      sending a request for said portlet and an assertion of said authentication strength level of said user from said consumer portal to said producer portal;
      rejecting said request from said consumer portal if said authentication strength level of said user is less than said authentication strength level requirement for said portlet;
      rejecting said request from said consumer portal if said authentication strength assertion level of said consumer portal is not high enough to assert said authentication strength level of said user; and
      accepting said request from said consumer portal if said authentication strength level of said user is not less than said authentication strength level requirement for said portlet and said authentication strength assertion level of said consumer portal is high enough to assert said authentication strength level of said user.

* * * * *